US012689307B2

(12) United States Patent
Li

(10) Patent No.: US 12,689,307 B2
(45) Date of Patent: Jul. 21, 2026

(54) MEDIUM-VOLTAGE POWER CONVERSION SYSTEM AND DISTRIBUTED MEDIUM-VOLTAGE POWER CONVERSION SYSTEM

(71) Applicant: DELTA ELECTRONICS, INC., Taoyuan City (TW)

(72) Inventor: Sheng-Hua Li, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 288 days.

(21) Appl. No.: 18/380,976

(22) Filed: Oct. 17, 2023

(65) Prior Publication Data

US 2024/0223094 A1     Jul. 4, 2024

Related U.S. Application Data

(60) Provisional application No. 63/435,650, filed on Dec. 28, 2022.

(30) Foreign Application Priority Data

Aug. 7, 2023     (CN) ......................... 202310985323.X

(51) Int. Cl.
*H02M 7/06*     (2006.01)
*H02J 4/25*     (2026.01)
(Continued)
(52) U.S. Cl.
CPC .............. *H02M 7/064* (2013.01); *H02J 4/25* (2026.01); *H02M 1/0083* (2021.05); *H02M 1/008* (2021.05); *H02M 3/33576* (2013.01)

(58) Field of Classification Search
CPC .... H02M 7/064; H02M 3/33576; H02M 7/08; H02M 7/2176; H02J 5/00
See application file for complete search history.

(56) References Cited

U.S. PATENT DOCUMENTS 10,680,508 B2 *  6/2020  Wang ..................... H02M 7/49
11,370,314 B1 *  6/2022  Keister ................... B60L 53/22
(Continued)

FOREIGN PATENT DOCUMENTS

CN     115066818 A     9/2022
CN     111384718 B     11/2022
(Continued)

OTHER PUBLICATIONS

Office Action dated Mar. 6, 2024 of the corresponding Taiwan patent application No. 112129506.

*Primary Examiner* — Gary L Laxton
(74) *Attorney, Agent, or Firm* — MUNCY, GEISSLER, OLDS & LOWE, P.C.

(57)     ABSTRACT
A medium-voltage (MV) power conversion system receives a MV AC power source, and converts the MV AC power source into DC power sources to supply power to loads. The MV power conversion system includes a plurality of power modules, and each power module includes a MV AC switch and a MV isolated AC-to-DC converter. The MV isolated AC-to-DC converter is connected in series to the MV AC switch. Input sides of the plurality of MV AC switches are connected to each other, and connected of the MV AC power source so that the plurality of MV isolated AC-to-DC converters individually convert the MV AC power source into the DC power sources.

17 Claims, 6 Drawing Sheets

(51) Int. Cl.
    *H02M 1/00*          (2006.01)
    *H02M 3/335*      (2006.01)

(56)                  References Cited

U.S. PATENT DOCUMENTS

| | | | |
|---|---|---|---|
| 11,509,233 B1 * | 11/2022 | Keister | B60L 3/0046 |
| 2009/0244945 A1 * | 10/2009 | Hatanaka | H02M 7/23 |
| | | | 363/127 |
| 2016/0141967 A1 | 5/2016 | Yan et al. | |
| 2018/0183335 A1 * | 6/2018 | Fan | H02M 1/4225 |
| 2018/0351349 A1 * | 12/2018 | Rajagopalan | H02H 7/125 |
| 2019/0052177 A1 * | 2/2019 | Lu | H02M 7/217 |
| 2021/0126541 A1 * | 4/2021 | Zhang | H02M 7/12 |
| 2021/0273552 A1 * | 9/2021 | Tian | H02M 1/14 |
| 2022/0269325 A1 | 8/2022 | Huang et al. | |
| 2022/0416671 A1 * | 12/2022 | Huang | H02M 7/217 |
| 2023/0077401 A1 * | 3/2023 | Yu | H02M 1/0058 |
| | | | 363/41 |
| 2024/0267598 A1 * | 8/2024 | Giladi | H04N 21/26258 |
| 2025/0030355 A1 * | 1/2025 | Juchem | C25B 1/04 |
| 2025/0119054 A1 * | 4/2025 | Jean-Pierre | H02M 1/007 |

FOREIGN PATENT DOCUMENTS

| | | | |
|---|---|---|---|
| DE | 102020103076 A1 * | 8/2021 | H02J 5/00 |
| TW | 201620226 A | 6/2016 | |
| TW | 201902070 A | 1/2019 | |
| TW | 202103419 A | 1/2021 | |

* cited by examiner

10

10

MEDIUM-VOLTAGE POWER CONVERSION SYSTEM AND DISTRIBUTED MEDIUM-VOLTAGE POWER CONVERSION SYSTEM

CROSS-REFERENCE TO RELATED APPLICATION

This patent application claims the benefit of U.S. Provisional Patent Application No. 63/435,650, filed Dec. 28, 2022, which is incorporated by reference herein.

BACKGROUND

Technical Field

The present disclosure relates to a medium-voltage power conversion system and a distributed medium-voltage power conversion system, and more particularly to a medium-voltage power conversion system and a distributed medium-voltage power conversion system applied to a solid-state transformer (SST) structure.

Description of Related Art

The statements in this section merely provide background information related to the present disclosure and do not necessarily constitute prior art.

A complete data center system power structure can be divided into three levels: a system-level power, a rack-level power, and a board-level power. Typically, a medium-voltage power from the power grid, including but not limited to 4 kV-35 kV alternating current (MVAC), is supplied to the data center as the input power source. MVAC is first converted into alternating current (AC) lines, such as 220-volt or 380-volt lines. The voltages of these AC lines will ultimately be distributed to the racks through UPS to enhance the reliability of power supply.

The AC line voltage is converted through an AC-to-DC converter (commonly known as a switching power supply) inside the rack into a 12-volt or 48-volt direct current (DC) voltage, which is then distributed to the circuit boards. The 12-volt or 48-volt DC voltage will ultimately be converted into multiple sets of lower DC voltages, such as 5 volts, 3.3 volts, 2.5 volts, or 1 volt, to supply power to data processing loads such as CPUs, ASICs, or memory units. Unfortunately, the power conversion efficiency for the motherboard remains below 90%. Taking into account the typical efficiency of 96% for UPS and rack power sources, as well as 99% for transformers, the overall efficiency of the system still falls below 80%.

Therefore, how to design a medium-voltage power conversion system and a distributed medium-voltage power conversion system to solve the problems and technical bottlenecks in the existing technology has become a critical topic in this field.

SUMMARY

An objective of the present disclosure is to provide a medium-voltage power conversion system. The medium-voltage power conversion system receives a medium-voltage AC power source, and converts the medium-voltage AC power source into at least one low-voltage DC power source to supply power to at least one load. The medium-voltage power conversion system includes a plurality of power modules. Each power module includes a medium-voltage AC switch and a medium-voltage isolated AC-to-DC converter. The medium-voltage isolated AC-to-DC converter is connected to the medium-voltage AC switch. Input sides of the plurality of the medium-voltage AC switches are connected to each other, and are connected to the medium-voltage AC power source so that the plurality of medium-voltage isolated AC-to-DC converters individually convert the medium-voltage AC power source into the at least one low-voltage DC power source.

Another objective of the present disclosure is to provide a distributed medium-voltage power conversion system. The distributed medium-voltage power conversion system includes a plurality of medium-voltage power conversion systems. The plurality of medium-voltage power conversion systems respectively receives a medium-voltage AC power source, and convert the medium-voltage AC power source into at least two low-voltage DC power sources to supply power to at least two loads.

Accordingly, the present disclosure has the following features and advantages: 1. the circuit structure of the present disclosure (with parallel connection on the input side) offers increased power supply design flexibility, versatility, and enhanced power supply coordination performance: 2. through the common interconnection buses among multiple medium-voltage power conversion systems, whose outputs are redundant, interactive redundant power supply can not only enhance power reliability but also provide mutual backup: 3. the low-voltage DC power sources converted by the power modules of the medium-voltage power conversion systems through the DC buses are used to charge and store energy in the battery cabinets, thereby achieving the benefits of uninterrupted DC power backup: 4. multiple medium-voltage power conversion systems may be positioned above or alongside the corresponding battery cabinets and server racks in response to spatial requirements or constraints, thereby enhancing flexibility in space allocation, simplifying wiring complexity, and reducing costs.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
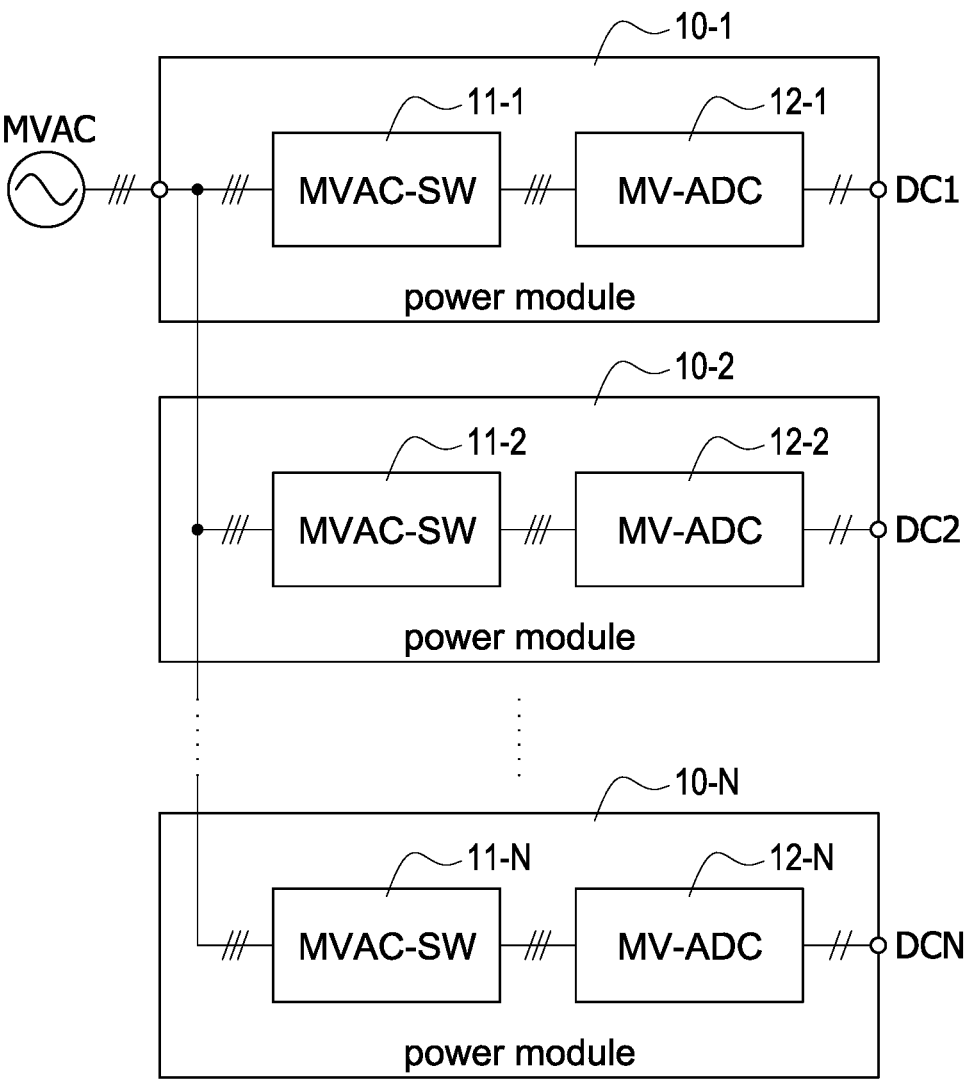
FIG. 1 is a block circuit diagram of a medium-voltage power conversion system according to a first embodiment of the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a medium-voltage power conversion system according to a first embodiment of the present disclosure. The medium-voltage power conversion system receives a medium-voltage AC (alternating current) power source MVAC. The voltage of the medium-voltage AC power source MVAC may range from several thousand volts (kV) to tens of thousands of volts, such as but not limited to 4.16 KV, 10 KV, or 13.8 kV. The medium-voltage power conversion system converts the medium-voltage AC power source MVAC into at least one low-voltage DC (direct current) power source DC to supply power to at least one load. The voltage of the at least one low-voltage DC power supply DC may range from tens of volts to hundreds of volts, such as but not limited to 48 volts, 270 volts, or 380 volts. In the present disclosure, the at least one load may be an information technology (IT) load configured in a data center, where information technology covers various technologies for collecting, using, transmitting, and storing digital information, and is a type of information and communication technology. Alternatively, the at least one load may be a charging station. However, the type of load is not intended to limit the technical spirit of the present disclosure.

As shown in FIG. 1, the medium-voltage power conversion system includes a plurality of power modules 10-1 to 10-N, and the circuit structure and electrical behavior of each power module 10-1 to 10-N are the same. In the embodiment shown in FIG. 1, each power module 10-1 to 10-N includes a medium-voltage AC switch (MVAC-SW) 11-1 to 11-N and a medium-voltage isolated AC-to-DC converter (MV-ADC) 12-1 to 12-N. The medium-voltage isolated AC-to-DC converter 12-1 to 12-N is connected to the medium-voltage AC switch 11-1 to 11-N in series. For example, the first power module 10-1 includes a first medium-voltage AC switch 11-1 and a first medium-voltage isolated AC-to-DC converter 12-1 connected in series. The second power module 10-2 includes a second medium-voltage AC switch 11-2 and a second medium-voltage isolated AC-to-DC converter 12-2 connected in series. Similarly, the Nth power module 10-N includes a Nth medium-voltage AC switch 11-N and a Nth medium-voltage isolated AC-to-DC converter 12-N connected in series.

Since each power module 10-1 to 10-N has its own isolation, it is suitable for use with multiple power outputs. In such a circuit structure, the output power of each power module 10-1 to 10-N is relatively low, such as but not limited to 200 kW or lower. Therefore, it is more conducive to the distributed data center structure when applied to the low-power solid-state transformer (SST) platform.

In this embodiment, input sides of these medium-voltage AC switches 11-1 to 11-N are connected to each other and connected to the medium-voltage AC power source MVAC so that each medium-voltage isolated AC-to-DC converter 12-1 to 12-N can individually perform DC conversion on the medium-voltage AC power source MVAC to generate the low-voltage DC power source DC1-DCN. For example, an input side of the first medium-voltage AC switch 11-1, an input side of the second medium-voltage AC switch 11-2, . . . , and an input side of the Nth medium-voltage AC switch 11-N are connected to each other. Essentially these input sides are connected in parallel and then connected to the medium-voltage AC power source MVAC. Compared with the circuit structure where these input sides are connected in series, based on power balance considerations, each power module must work at the same power to jointly output power through a single output terminal. Therefore, the circuit structure of the present disclosure (theses input sides are connected in parallel) has better power design flexibility and better power cooperative operation performance.

When the first medium-voltage AC switch 11-1 is turned on, the first medium-voltage isolated AC-to-DC converter 12-1 converts the medium-voltage AC power source MVAC to generate a first low-voltage DC power source DC1 by the AC-to-DC conversion. When the second medium-voltage AC switch 11-2 is turned on, the second medium-voltage isolated AC-to-DC converter 12-2 converts the medium-voltage AC power source MVAC to generate a second low-voltage DC power source DC2 by the AC-to-DC conversion. Similarly, when the Nth medium-voltage AC switch 11-N is turned on, the Nth medium-voltage isolated AC-to-DC converter 12-N converts the medium-voltage AC power source MVAC to generate a Nth low-voltage DC power source DCN by the AC-to-DC conversion. However, the above-mentioned AC-to-DC conversion operation does not limit only one power module to operate at the same time, and can control the corresponding medium-voltage AC switches 11-1 to 11-N to be turned on according to the demand of the load. Therefore, the corresponding medium-voltage isolated AC-to-DC converters 12-1 to 12-N can be controlled to perform AC-to-DC conversion to generate corresponding low-voltage DC power sources DC1 to DCN.

In one embodiment, each of the medium-voltage isolated AC-to-DC converters 12-1 to 12-N is a three-phase single-stage AC-to-DC converter. Therefore, the received medium-voltage AC power source MVAC is a three-phase AC power source. Specifically, each phase of the three-phase medium-voltage AC power source MVAC is correspondingly connected to each phase of the corresponding three-phase AC-to-DC converter through three-phase medium-voltage AC switches 11-1 to 11-N.

Figure 2:
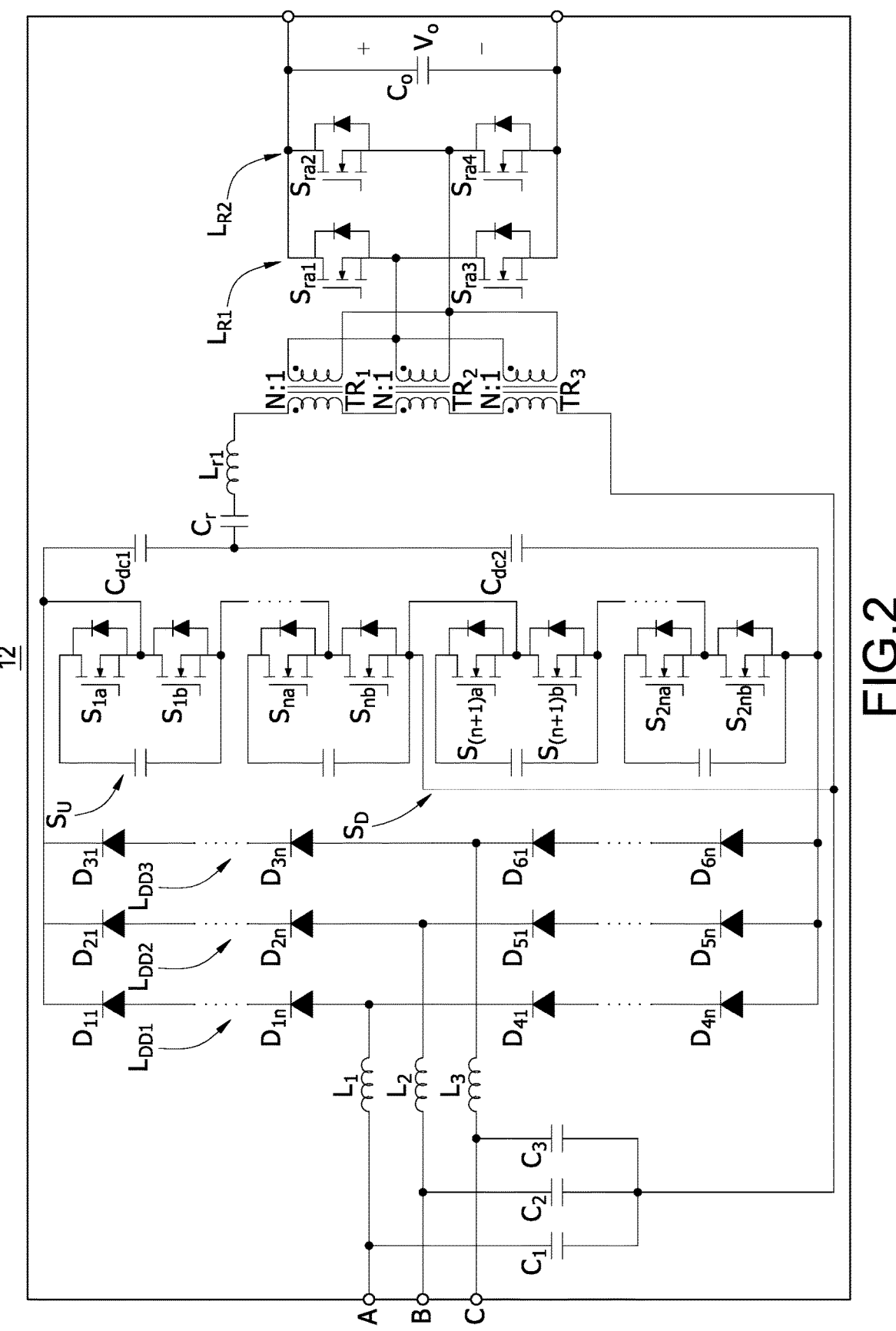
FIG. 2 is a circuit diagram of a medium-voltage isolated AC-to-DC converter of the medium-voltage power conversion system according to the present disclosure.

Please refer to FIG. 2, which shows a circuit diagram of a medium-voltage isolated AC-to-DC converter of the medium-voltage power conversion system according to the present disclosure. The medium-voltage isolated AC-to-DC converter 12 shown in FIG. 2 is a three-phase AC-to-DC converter, and its input ends A, B, C are correspondingly connected to three phases R, S, T of the medium-voltage AC power source MVAC. As mentioned above, since the medium-voltage isolated AC-to-DC converters 12-1 to 12-N are connected in parallel, the input voltage of each medium-voltage isolated AC-to-DC converter 12-1 to 12-N is the medium-voltage AC power source MVAC. Therefore, for each medium-voltage isolated AC-to-DC converter 12-1 to 12-N, it is an indispensable consideration to have a withstand voltage circuit design.

Accordingly, the medium-voltage isolated AC-to-DC converter 12 shown in FIG. 2 includes three transformers $TR_1$, $TR_2$, $TR_3$, a primary-side circuit, and a secondary-side circuit. Each transformer $TR_1$, $TR_2$, $TR_3$ includes a primary-side winding and a secondary-side winding. In particular, the three primary-side windings are coupled in series to form a primary side, and the three secondary-side windings are coupled in parallel to form a secondary side.

The primary-side circuit is coupled to the primary side, and the primary-side circuit includes three input capacitors $C_1$, $C_2$, $C_3$, three input inductors $L_1$, $L_2$, $L_3$, three diode bridge arms $L_{DD1}$, $L_{DD2}$, $L_{DD3}$, a switch conversion stage $S_U$, $S_D$, a capacitor assembly $C_{dc1}$, $C_{dc2}$, and a resonant circuit $C_r$, $L_{r1}$. The three input capacitors $C_1$, $C_2$, $C_3$ are respectively connected to three inputs of the medium-voltage AC power source MVAC. The three input inductors $L_1$, $L_2$, $L_3$ are respectively connected to the three inputs of the medium-voltage AC power source MVAC. The three diode bridge arms $L_{DD1}$, $L_{DD2}$, $L_{DD3}$ are respectively connected to the three input inductors $L_1$, $L_2$, $L_3$. The switch conversion stage $S_U$, $S_D$ is connected to the three diode bridge arms $L_{DD1}$, $L_{DD2}$, $L_{DD3}$ in parallel. The capacitor assembly $C_{dc1}$, $C_{dc2}$ is connected to the switch conversion stage $S_U$, $S_D$ in parallel. The resonant circuit $C_r$, $L_{r1}$ is connected between the capacitor assembly $C_{dc1}$, $C_{dc2}$ and the primary side.

The secondary-side circuit is coupled to the secondary side, and the secondary-side circuit includes rectification switch bridge arms $L_{R1}$-$L_{R2}$ and an output capacitor Co, and the output capacitor Co is connected to the rectification switch bridge arms $L_{R1}$-$L_{R2}$.

Specifically, as shown in FIG. 2, the three input capacitors $C_1$, $C_2$, $C_3$ are connected to the three inputs of the medium-voltage AC power source MVAC. The three input inductors $L_1$, $L_2$, $L_3$ include a first input inductor $L_1$, a second input inductor $L_2$, and a third input inductor $L_3$. In one embodiment, the first input inductor $L_1$ is connected to the first input capacitors $C_1$ and an R phase of the medium-voltage AC power source MVAC, the second input inductor $L_2$ is connected to the second input capacitors $C_2$ and an S phase of the medium-voltage AC power source MVAC, and the third input inductor Ls is connected to the third input capacitors $C_3$ and a T phase of the medium-voltage AC power source MVAC.

The three diode bridge arms $L_{DD1}$, $L_{DD2}$, $L_{DD3}$ include a first diode bridge arm $L_{DD1}$, a second diode bridge arm $L_{DD2}$, and a third diode bridge arm $L_{DD3}$. The first diode bridge arm $L_{DD1}$ includes a first upper bridge arm and a first lower bridge arm. The first upper bridge arm includes a plurality of diodes $D_{11}$-$D_{1n}$ connected in series and the first lower bridge arm includes a plurality of diodes $D_{41}$-$D_{4n}$ connected in series. The first upper bridge arm and the first lower bridge arm are commonly connected with the first input inductor $L_1$. The second diode bridge arm $L_{DD2}$ includes a second upper bridge arm and a second lower bridge arm. The second upper bridge arm includes a plurality of diodes $D_{21}$-$D_{2n}$ connected in series and the second lower bridge arm includes a plurality of diodes $D_{51}$-$D_{5n}$ connected in series. The second upper bridge arm and the second lower bridge arm are commonly connected with the second input inductor $L_2$. The third diode bridge arm $L_{DD3}$ includes a third upper bridge arm and a third lower bridge arm. The third upper bridge arm includes a plurality of diodes $D_{31}$-$D_{3n}$ connected in series and the third lower bridge arm includes a plurality of diodes $D_{61}$-$D_{6n}$ connected in series. The third upper bridge arm and the third lower bridge arm are commonly connected with the third input inductor $L_3$. Therefore, by designing the three diode bridge arms $L_{DD1}$, $L_{DD2}$, $L_{DD3}$ to be a structure in which components are connected in series, that is, each upper or lower bridge arm has multiple diodes connected in series to increase the voltage withstand of each diode bridge arm to the medium-voltage AC power source MVAC.

The switch conversion stage $S_U$, $S_D$ includes an upper switch bridge arm $S_U$ and a lower switch bridge arm $S_D$ connected in series. The upper switch bridge arm $S_U$ includes a plurality of switch modules connected in series, and each switch module includes two active switches $S_{1a}$-$S_{1b}$, $S_{na}$-$S_{nb}$ connected in series. The lower switch bridge arm $S_D$ includes a plurality of switch modules connected in series, and each switch module includes two active switches $S_{(n+1)a}$-$S_{(n+1)b}$, $S_{2na}$-$S_{2nb}$ connected in series. Therefore, the switch conversion stage $S_U$, $S_D$ includes 2n switch modules in total.

A common-connected node of the first switch module Sla-Sib of the upper switch bridge arm $S_U$ is connected to a total cathode end (i.e., a positive end of the system) of the three diode bridge arms $L_{DD1}$, $L_{DD2}$, $L_{DD3}$. A common-connected node of the first switch module $S_{(n+1)a}$-$S_{(n+1)b}$ of the lower switch bridge arm $S_D$ is connected to the active switch $S_{nb}$ of the last switch module $S_{na}$-$S_{nb}$ of the upper switch bridge arm $S_U$, and connected to a common-connected node of the three input capacitors $C_1$, $C_2$, $C_3$ and the primary side, i.e., a neutral end of an input side of the medium-voltage isolated AC-to-DC converter 12. The active switch $S_{2nb}$ of the last switch module $S_{2na}$-$S_{2nb}$ of the lower switch bridge arm $S_D$ is connected to a total anode end (i.e., a negative end of the system) of the three diode bridge arms $L_{DD1}$, $L_{DD2}$, $L_{DD3}$.

Figure 3:
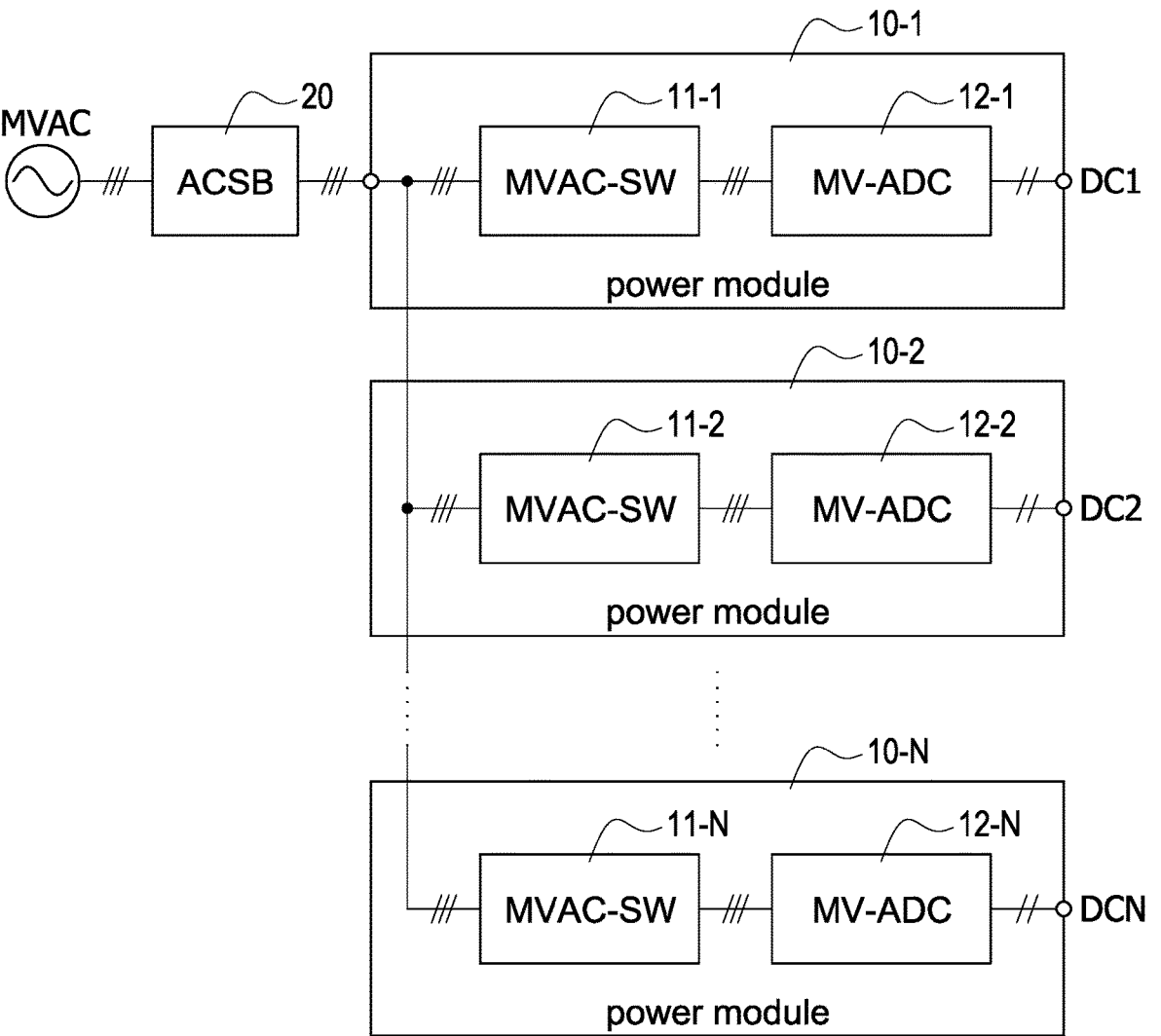
FIG. 3 is a block circuit diagram of the medium-voltage power conversion system according to a second embodiment of the present disclosure.

Please refer to FIG. 3, which shows a block circuit diagram of the medium-voltage power conversion system according to a second embodiment of the present disclosure. The major difference between the second embodiment shown in FIG. 3 and the first embodiment shown in FIG. 1 is that the medium-voltage power conversion system further includes an AC switchboard 20. In one embodiment, the AC switchboard 20 is a three-phase AC switchboard is also referred to a distribution panel or a switch box. The AC switchboard 20 is connected between input ends of the plurality of medium-voltage AC switches 11-1 to 11-N and the medium-voltage AC power source MVAC. The AC switchboard 20 is a complete set of devices for centralized installation of switches, meters and other equipment, and used to assemble the switches and circuit breaker equipment, measurement instruments, protective appliances, and auxiliary equipment on the panels of the metal cabinet to easily to manage and facilitates maintenance when circuit failures occur. In other words, the AC switchboard 20 can be easily disconnected and separated from the feeder of the previous medium-voltage AC power source MVAC when the solid-state transformer (SST) system needs to be maintained or repaired.

Figure 4:
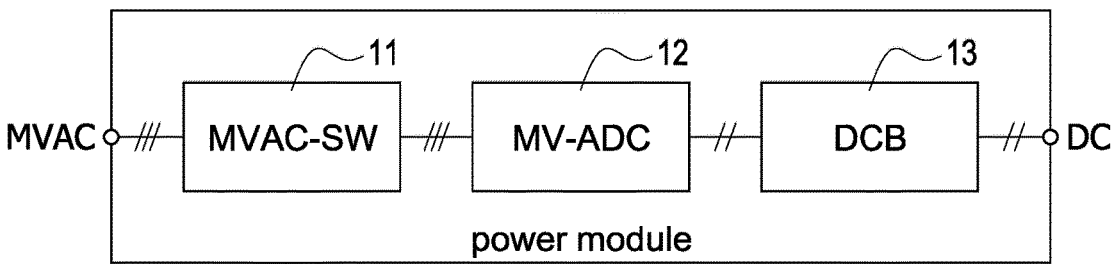
FIG. 4 is a block circuit diagram of a power module of the medium-voltage power conversion system according to a first embodiment of the present disclosure.

Please refer to FIG. 4, which shows a block circuit diagram of a power module of the medium-voltage power conversion system according to a first embodiment of the present disclosure. The major difference between the power module 10 shown in FIG. 4 and the power module shown in FIG. 1 is that the power module 10 further includes a DC circuit breaker 13, that is, the DC circuit breaker 13 is disposed inside the power module 10 and controlled by a controller inside the power module 10. The DC circuit breaker 13 is connected between the output side of the medium-voltage isolated AC-to-DC converter 12 and the load LD1, LD2. When the power module 10 is abnormal (for example but not limited to, an over-voltage abnormality, an over-current abnormality, or an over-temperature abnormality), the DC circuit breaker 13 controlled to disconnect the load LD1, LD2 from peripheral circuits connected to the load LD1, LD2 so as to avoid affecting the peripheral circuits and further implement the corresponding over-voltage protection, over-current protection, or over-temperature protection. Alternatively, when the load LD1, LD2 is abnormal, the load LD1, LD2 will be isolated/separated from the power module 10 by disconnecting the DC circuit breaker 13 so as to protect the power module 10. Alternatively, the DC circuit breaker 13 can be actively isolated at specific times based on pre-scheduling within the entire medium-voltage power conversion system to disconnect the loads LD1, LD2 from the power module 10.

Figure 5:
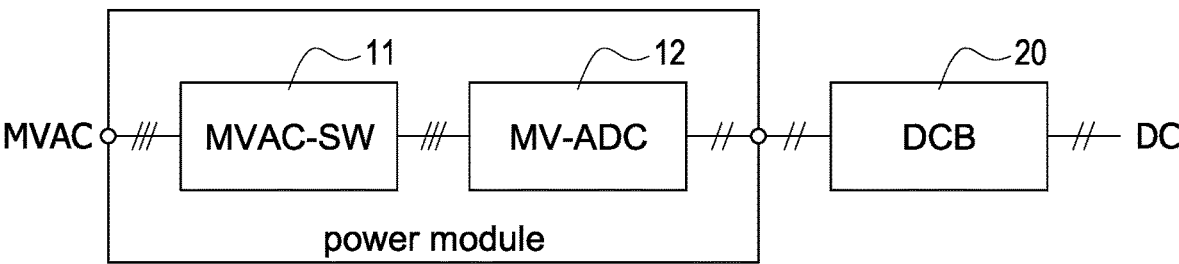
FIG. 5 is a block circuit diagram of the power module of the medium-voltage power conversion system according to a second embodiment of the present disclosure.

Please refer to FIG. 5, which shows a block circuit diagram of the power module of the medium-voltage power conversion system according to a second embodiment of the present disclosure. The major difference between the second embodiment shown in FIG. 5 and the first embodiment shown in FIG. 4 is that the DC circuit breaker 13 is disposed outside the power module 10. That is, the DC circuit breaker 20 is connected to the output side of the power module 10, i.e., between the medium-voltage isolated AC-to-DC converter 12-1 to 12-N and the load LD1, LD2. The DC circuit breaker 20 disposed outside the power module 10 can be used to easily disconnect the single power module 10 of the solid-state transformer (SST) system and separate it from the rear-end load without affecting other circuits under the normal operation when the power module 10 needs to be maintained or repaired. In this embodiment, the DC circuit breaker 20 may be a mechanical switch, which can be controlled manually or through a circuit so as to achieve the functions described in the embodiment shown in FIG. 4.

Figure 6:
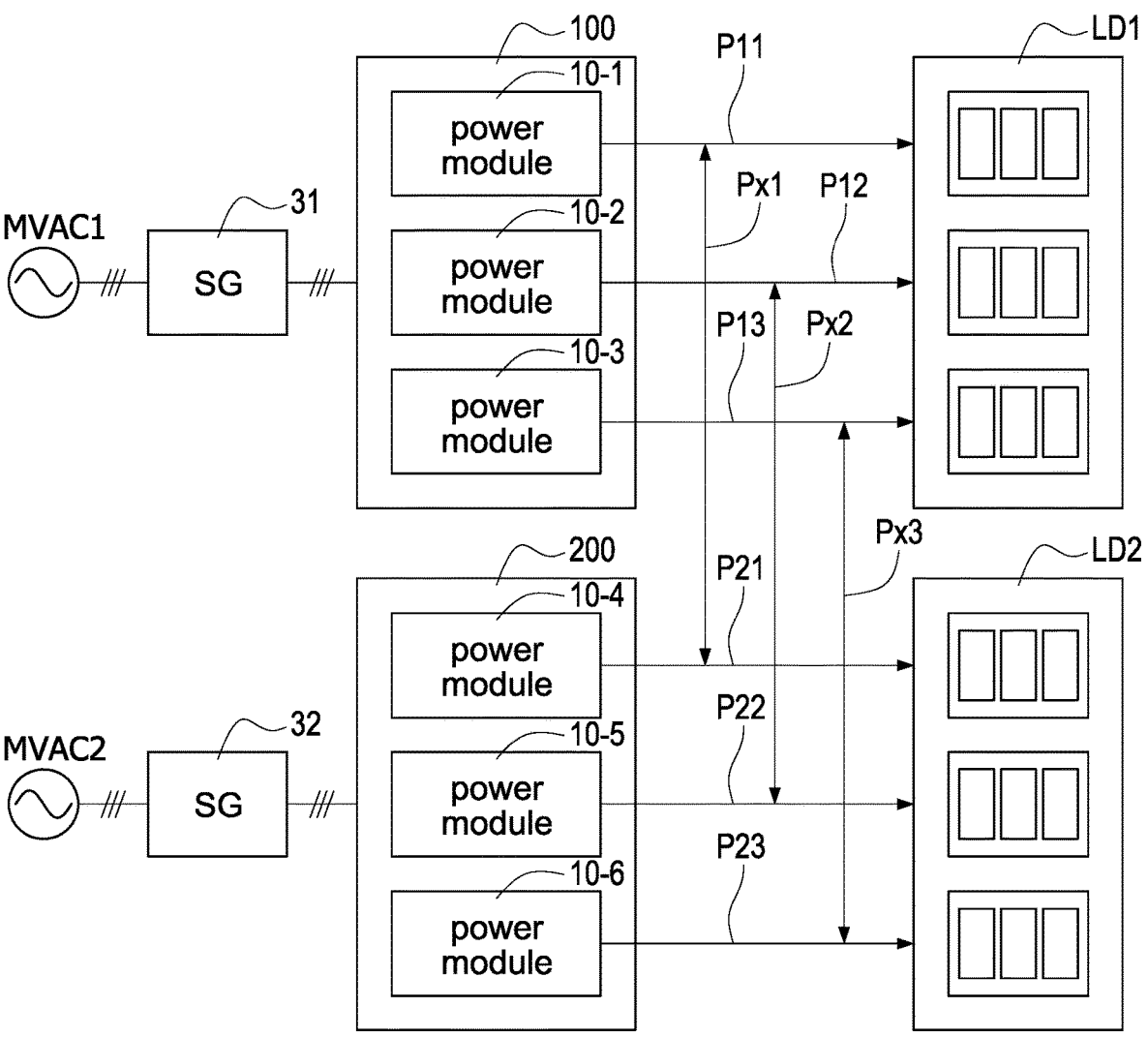
FIG. 6 is a block circuit diagram of a distributed medium-voltage power conversion system according to the present disclosure.
Figure 7:
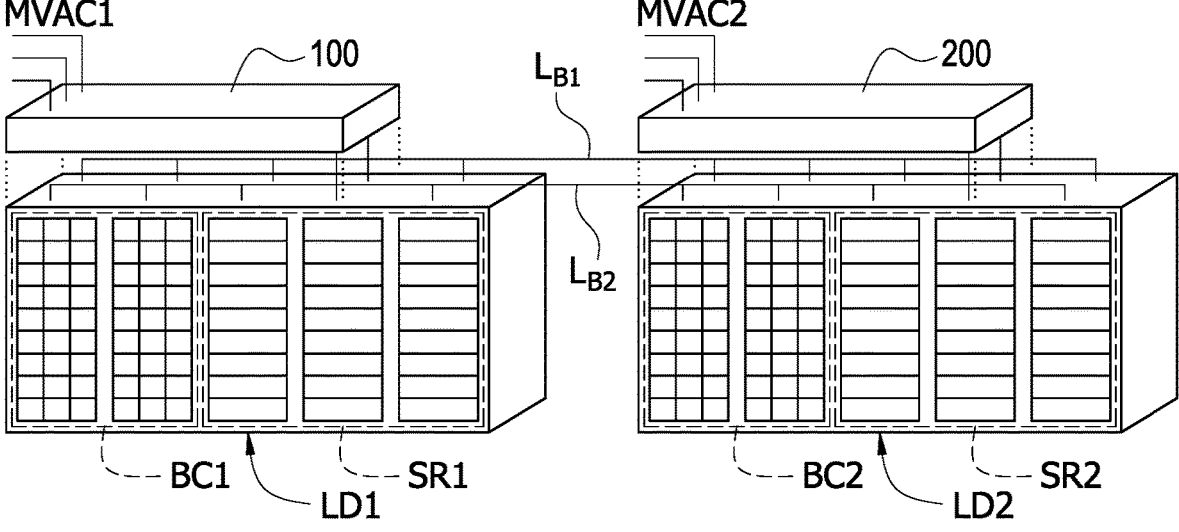
FIG. 7 is a schematic structure diagram of the distributed medium-voltage power conversion system according to the present disclosure.

Please refer to FIG. 6 and FIG. 7, which respectively show a block circuit diagram and a schematic structure diagram of a distributed medium-voltage power conversion system according to the present disclosure. As shown in FIG. 6, the distributed medium-voltage power conversion system includes two medium-voltage power conversion systems, but this is not intended to limit the present disclosure, i.e., may include more than two medium-voltage power conversion systems. Taking FIG. 6 and FIG. 7 as an example, the distributed medium-voltage power conversion system includes a first medium-voltage power conversion system 100 and a second medium-voltage power conversion system 200. The first medium-voltage power conversion system 100 receives a first medium-voltage AC power source MVAC1 through a first switchgear 31 of the AC switchboard 20 shown in FIG. 3, and converts the first medium-voltage AC power source MVAC1 into a plurality of low-voltage DC power sources to supply power to a first load LD1 and/or a second load LD2. The second medium-voltage power conversion system 200 receives a second medium-voltage AC power source MVAC2 through a second switchgear 32 of the AC switchboard 20 shown in FIG. 3, and converts the second medium-voltage AC power source MVAC2 into a plurality of low-voltage DC power sources to supply power to the first load LD1 and/or the second load LD2. The detail descriptions are as follows.

In the embodiment shown in FIG. 6, the first medium-voltage power conversion system includes three power modules, having a first power module 10-1, a second power module 10-2, and a third power module 10-3. The second medium-voltage power conversion system includes three power modules, having a fourth power module 10-4, a fifth power module 10-5, and a sixth power module 10-6. The low-voltage DC power sources generated by the first medium-voltage power conversion system and the second medium-voltage power conversion system can separately supply power to the first load LD1 and the second load LD2, or can jointly supply power to the first load LD1 or the second load LD2.

Compared with the existing SST power conversion and power supply operations for downstream equipment, it provides a single integrated structure with megawatt (MW)-level power supply capability. Therefore, a single SST is sufficient to provide the required power to multiple clusters (where each cluster includes multiple racks). For example, the output power of a single SST in the existing structure is about 1-1.2 MW. It is assumed that one cabinet needs 40 KW of power electricity, and therefore one SST can supply about 30 cabinets. Since these cabinets are wired together, they are powered by the same SST. However, once the power module in the SST is damaged, the SST will no longer be able to provide such a high-wattage power supply capability, and the cabinets powered by it will be unusable due to power failure, thus greatly reducing the reliability of its power supply.

Compared with the existing SST with megawatt-level output supply capability, in the present disclosure, the output of each SST is about 200 KW (smaller volume), which has the advantage of distributed power supply. For example, it is assumed each SST supplies power to a cluster with three cabinets (requiring 120 KW). When input DC terminals of two clusters are connected together, each SST can be used by cabinets of different clusters, in other words, one SST can supply power of 240 KW required by two clusters having 6 cabinets in short-term overload power electricity.

Specifically, a first low-voltage DC power source generated by the first power module 10-1 supplies power to the first load LD1 through a first power-supplying path P11. A second low-voltage DC power source generated by the second power module 10-2 supplies power to the first load LD1 through a second power-supplying path P12. A third low-voltage DC power source generated by the third power module 10-3 supplies power to the first load LD1 through a third power-supplying path P13. A fourth low-voltage DC power source generated by the fourth power module 10-4 supplies power to the second load LD2 through a fourth power-supplying path P21. A fifth low-voltage DC power source generated by the fifth power module 10-5 supplies power to the second load LD2 through a fifth power-supplying path P22. A sixth low-voltage DC power source generated by the sixth power module 10-6 supplies power to the second load LD2 through a sixth power-supplying path P23.

In particular, a first connection path Px1 is provided between the first power-supplying path P11 and the fourth power-supplying path P21, a second connection path Px2 is provided between the second power-supplying path P12 and the fifth power-supplying path P22, and a third connection path Px3 is provided between the third power-supplying path P13 and the sixth power-supplying path P23.

In another embodiment shown in FIG. 6, the first low-voltage DC power source generated by the first power module 10-1 further supplies power to the second load LD2 through the first connection path Px1 and the fourth power-supplying path P21. The second low-voltage DC power source generated by the second power module 10-2 further supplies power to the second load LD2 through the second connection path Px2 and the fifth power-supplying path P22. The third low-voltage DC power source generated by the third power module 10-3 further supplies power to the second load LD2 through the third connection path Px3 and the sixth power-supplying path P23. The fourth low-voltage DC power source generated by the fourth power module 10-4 further supplies power to the first load LD1 through the first connection path Px1 and the first power-supplying path P11. The fifth low-voltage DC power source generated by the fifth power module 10-5 further supplies power to the first load LD1 through the second connection path Px2 and the second power-supplying path P12. The sixth low-voltage DC power source generated by the sixth power module 10-6 further supplies power to the first load LD1 through the third connection path Px3 and the third power-supplying path P13.

Accordingly, the distributed medium-voltage power conversion system of the present disclosure can provide the function of redundant power supply. When the two medium-voltage power conversion systems are both normal, the low-voltage DC power generated by itself can be provided to supply the required power to the loads which are responsible for. However, once any one of the medium-voltage power conversion systems occurs abnormality, the normal medium-voltage power conversion systems can not only supply power to the loads which are responsible by the normal medium-voltage power conversion systems, but also supply power to the load which is responsible by the abnormal medium-voltage power conversion system, thereby significantly increasing the reliability of the power supply.

For example, when the first medium-voltage AC power source MVAC1 and the second medium-voltage AC power source MVAC2 both normally supply power, the low-voltage DC power sources generated by the first power module 10-1, the second power module 10-2, and the third power module 10-3 can supply power to the first load LD1 through the first power-supplying path P11, the second power-supplying path P12, and the third power-supplying path P13, respectively. Similarly, the low-voltage DC power sources generated by the fourth power module 10-4, the fifth power module 10-5, and the sixth power module 10-6 can supply power to the second load LD2 through the fourth power-supplying path P21, the fifth power-supplying path P22, and the sixth power-supplying path P23, respectively.

Once the second medium-voltage AC power source MVAC2 occurs abnormality, not only the low-voltage DC power sources generated by the first power module 10-1, the second power module 10-2, and the third power module 10-3 can supply power to the first load LD1 through the first power-supplying path P11, the second power-supplying path P12, and the third power-supplying path P13, respectively, but also the low-voltage DC power source generated by the first power module 10-1 can further supply power to the second load LD2 through the first connection path Px1 and the fourth power-supplying path P21, the low-voltage DC power source generated by the second power module 10-2 can further supply power to the second load LD2 through the second connection path Px2 and the fifth power-supplying path P22, and the low-voltage DC power source generated by the third power module 10-3 can further supply power to the second load LD2 through the third connection path Px3 and the sixth power-supplying path P23. Accordingly, normal operation of all loads can be maintained until the second medium-voltage AC power source MVAC2 is restored.

The schematic structure diagram of the above-mentioned two medium-voltage power conversion systems is shown in FIG. 7. In particular, the first load LD1 and the second load LD2 may be information technology (IT) loads disposed in a data center, which respectively have a plurality of battery cabinets BC1, BC2 and a plurality of server racks SR1, SR2. As shown in FIG. 7, due to the miniaturization of a single medium-voltage power conversion system, SST performs a distributed design into a modular structure, that is, a decentralized modular architecture, the first medium-voltage power conversion system 100 and the second medium-voltage power conversion system 200 configured with a plurality of power modules can be respectively installed on the corresponding loads LD1, LD2. That is, shared DC buses $L_{B1}$, $L_{B2}$ are used to execute the operation of redundant power supply for the battery cabinets BC1, BC2 and the server racks SR1, SR2 of the loads LD1, LD2. In this way, the low-voltage DC power sources converted by the power modules of the medium-voltage power conversion systems are transmitted to the battery cabinets BC1, BC2 through the DC buses $L_{B1}$, $L_{B2}$ to charge and store energy. Compared to traditional uninterrupted AC power backup system that require two-stage power conversions, including AC-to-DC and DC-to-AC conversions, the backup efficiency is better. In addition, the first medium-voltage power conversion system 100 and the second medium voltage conversion system 200 can also be arranged on the sides of the battery cabinets BC1, BC2 and the server racks SR1, SR2 respectively (not shown in figures) in response to the height restriction of the available space, and therefore the redundant power supply operation can also be realized through the shared DC buses $L_{B1}$, $L_{B2}$.

Incidentally, each group of SST modules only needs to provide stable power to the downstream devices and loads for which it is responsible. The upstream power supply equipment for these SST modules can be centrally controlled to determine the status of each SST module and its corresponding feeder line, as well as to coordinate the operation of power supply to the individual SST module. Moreover, during annual maintenance, routine maintenance, or in the event of power abnormalities of the SST modules, the respective decoupling switches can be used to disconnect each SST module.

In summary, the present disclosure has the following features and advantages:

1. The circuit structure of the present disclosure (with parallel connection on the input side) offers increased power supply design flexibility, versatility, and enhanced power supply coordination performance.
2. Through the common interconnection buses among multiple medium-voltage power conversion systems, whose outputs are redundant, interactive redundant power supply can not only enhance power reliability but also provide mutual backup.
3. The low-voltage DC power sources converted by the power modules of the medium-voltage power conversion systems through the DC buses are used to charge and store energy in the battery cabinets, thereby achieving the benefits of uninterrupted DC power backup.
4. Multiple medium-voltage power conversion systems may be positioned above or alongside the corresponding battery cabinets and server racks in response to spatial requirements or constraints, thereby enhancing flexibility in space allocation, simplifying wiring complexity, and reducing costs.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A medium-voltage power conversion system, configured to receive a medium-voltage AC power source, and convert the medium-voltage AC power source into at least one low-voltage DC power source to supply power to at least one load, the medium-voltage power conversion system comprising:

a plurality of power modules, and each power module comprising:

a medium-voltage isolated AC-to-DC converter, wherein input sides of the plurality of power modules are connected to each other, and respectively connected to three phase inputs of the medium-voltage AC power source so that the plurality of medium-voltage isolated AC-to-DC converters individually convert the three phase inputs of the medium-voltage AC power source into the at least one low-voltage DC power source.

2. The medium-voltage power conversion system as claimed in claim 1, wherein each of the medium-voltage isolated AC-to-DC converters is a three-phase single-stage AC-to-DC converter.

3. The medium-voltage power conversion system as claimed in claim 1, wherein the plurality of power modules comprises a first power module and a second power module, the first power module comprising a first medium-voltage AC switch and a first medium-voltage isolated AC-to-DC converter, and the second power module comprising a second medium-voltage AC switch and a second medium-voltage isolated AC-to-DC converter, wherein the first medium-voltage isolated AC-to-DC converter converts the medium-voltage AC power source into a first low-voltage DC power source based on the first medium-voltage AC switch being turned on, and the second medium-voltage isolated AC-to-DC converter converts the medium-voltage AC power source into a second low-voltage DC power source based on the second medium-voltage AC switch being turned on.

4. The medium-voltage power conversion system as claimed in claim 3, wherein the medium-voltage isolated AC-to-DC converter comprises:

three transformers, each transformer comprising a primary-side winding and a secondary-side winding, wherein the three primary-side windings are coupled in series to form a primary side, and the three secondary-side windings are coupled in parallel to form a secondary side, a primary-side circuit, coupled to the primary side, and the primary-side circuit comprising:

three input capacitors, respectively connected to the three phase inputs of the medium-voltage AC power source, three input inductors, respectively connected to the three phase inputs of the medium-voltage AC power source, three diode bridge arms, respectively connected to the three input inductors, a switch conversion stage, connected to the three diode bridge arms in parallel, a capacitor assembly, connected to the switch conversion stage in parallel, and a resonant circuit, connected between the capacitor assembly and the primary side, and a secondary-side circuit, coupled to the secondary side, and the secondary-side circuit comprising:

a rectification switch bridge arm, connected to the secondary side, and an output capacitor, connected to the rectification switch bridge arm.

5. The medium-voltage power conversion system as claimed in claim 4, wherein the three diode bridge arms comprise a first diode bridge arm, a second diode bridge arm, and a third diode bridge arm, the first diode bridge arm, comprising a first upper bridge arm and a first lower bridge arm, wherein the first upper bridge arm comprises a plurality of diodes connected in series, and the first lower bridge arm comprises a plurality of diodes connected in series, the second diode bridge arm, comprising a second upper bridge arm and a second lower bridge arm, wherein the second upper bridge arm comprises a plurality of diodes connected in series, and the second lower bridge arm comprises a plurality of diodes connected in series, and the third diode bridge arm, comprising a third upper bridge arm and a third lower bridge arm, wherein the third upper bridge arm comprises a plurality of diodes connected in series, and the third lower bridge arm comprises a plurality of diodes connected in series.

6. The medium-voltage power conversion system as claimed in claim 4, wherein the switch conversion stage comprises an upper switch bridge arm and a lower switch bridge arm connected in series, the upper switch bridge arm comprising a plurality of switch modules connected in series, and each switch module comprising two active switches connected in series, and the lower switch bridge arm comprising a plurality of switch modules connected in series, and each switch module comprising two active switches connected in series.

7. The medium-voltage power conversion system as claimed in claim 6, wherein a common-connected node of a first switch module of the upper switch bridge arm is connected to a total cathode end of the three diode bridge arms; a common-connected node of a first switch module of the lower switch bridge arm is connected to the active switch of the last switch module of the upper switch bridge arm, a common-connected node of the three input capacitors, and the primary side; the active switch of the last switch module of the lower switch bridge arm is connected to a total anode end of the three diode bridge arms.

8. The medium-voltage power conversion system as claimed in claim 1, further comprising:

an AC switchboard, wherein each power module comprises a medium-voltage AC switches, wherein the AC switchboard is connected between input ends of the plurality of medium-voltage AC switches of the plurality of power modules and the medium-voltage AC power source.

9. The medium-voltage power conversion system as claimed in claim 1, wherein each power module further comprises:

a DC circuit breaker, connected between the medium-voltage isolated AC-to-DC converter and the load.

10. The medium-voltage power conversion system as claimed in claim 1, further comprising:

a DC circuit breaker, disposed outside the power module, and the DC circuit breaker connected between the medium-voltage isolated AC-to-DC converter and the load.

11. The medium-voltage power conversion system as claimed in claim 1, wherein the at least one load is an information technology load disposed in a data center.

12. The medium-voltage power conversion system as claimed in claim 1, wherein the at least one load comprises at least one battery cabinet and at least one server rack.

13. A distributed medium-voltage power conversion system, comprising a plurality of medium-voltage power conversion systems, wherein each medium-voltage power conversion system comprises a plurality of power modules, and each power module comprises:

a medium-voltage isolated AC-to-DC converter, wherein input sides of the plurality of power modules are connected to each other, and respectively connected to three phase inputs of the medium-voltage AC power source so that the plurality of medium-voltage isolated AC-to-DC converters individually convert the three phase inputs of the medium-voltage AC power source into the at least one low-voltage DC power source, wherein the plurality of medium-voltage power conversion systems, configured to respectively receive a medium-voltage AC power source, and convert the medium-voltage AC power source into at least two low-voltage DC power sources to supply power to at least two loads.

14. The distributed medium-voltage power conversion system as claimed in claim 13, wherein the plurality of medium-voltage power conversion systems comprises:

a first medium-voltage power conversion system, configured to receive a first medium-voltage AC power source, and convert the first medium-voltage AC power source into a plurality of low-voltage DC power sources outputted from the first medium-voltage power conversion system to supply power to a first load and/or a second load, and a second medium-voltage power conversion system, configured to receive a second medium-voltage AC power source, and convert the second medium-voltage AC power source into a plurality of low-voltage DC power sources outputted from the second medium-voltage power conversion system to supply power to the first load and/or the second load.

15. The distributed medium-voltage power conversion system as claimed in claim 14, wherein a first low-voltage DC power source and a second low-voltage DC power source respectively supply power to the first load and the second load, or the first low-voltage DC power source and the second low-voltage DC power source jointly supply power to the first load and/or the second load.

16. The distributed medium-voltage power conversion system as claimed in claim 14, wherein the first medium-voltage power conversion system comprises three power modules, having a first power module, a second power module, and a third power module; the second medium-voltage power conversion system comprises three power modules, having a fourth power module, a fifth power module, and a sixth power module, wherein a first low-voltage DC power source generated by the first power module is configured to supply power to the first load through a first power-supplying path, wherein a second low-voltage DC power source generated by the second power module is configured to supply power to the first load through a second power-supplying path, wherein a third low-voltage DC power source generated by the third power module is configured to supply power to the first load through a third power-supplying path, wherein a fourth low-voltage DC power source generated by the fourth power module is configured to supply power to the second load through a fourth power-supplying path, wherein a fifth low-voltage DC power source generated by the fifth power module is configured to supply power to the second load through a fifth power-supplying path, and wherein a sixth low-voltage DC power source generated by the sixth power module is configured to supply power to the second load through a sixth power-supplying path.

17. The distributed medium-voltage power conversion system as claimed in claim 16, wherein a first connection path is provided between the first power-supplying path and the fourth power-supplying path, a second connection path is provided between the second power-supplying path and the fifth power-supplying path, and a third connection path is provided between the third power-supplying path and the sixth power-supplying path, wherein the first low-voltage DC power source generated by the first power module is further configured to supply power to the second load through the first connection path and the fourth power-supplying path, wherein the second low-voltage DC power source generated by the second power module is further configured to supply power to the second load through the second connection path and the fifth power-supplying path, wherein the third low-voltage DC power source generated by the third power module is further configured to supply power to the second load through the third connection path and the sixth power-supplying path, wherein the fourth low-voltage DC power source generated by the fourth power module is further configured to supply power to the first load through the first connection path and the first power-supplying path, wherein the fifth low-voltage DC power source generated by the fifth power module is further configured to supply power to the first load through the second connection path and the second power-supplying path, and wherein the sixth low-voltage DC power source generated by the sixth power module is further configured to supply power to the first load through the third connection path and the third power-supplying path.

* * * * *